(12) United States Patent
Makiguchi et al.

(10) Patent No.: US 12,071,056 B2
(45) Date of Patent: Aug. 27, 2024

(54) SEAT STRUCTURE

(71) Applicant: HONDA MOTOR CO., LTD., Tokyo (JP)

(72) Inventors: Fumiya Makiguchi, Tokyo (JP); Masakazu Okada, Tokyo (JP); Jun Otsuki, Tokyo (JP); Ryosuke Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 17/881,766

(22) Filed: Aug. 5, 2022

(65) Prior Publication Data
US 2023/0045389 A1    Feb. 9, 2023

(30) Foreign Application Priority Data

Aug. 6, 2021 (JP) ................. 2021-129737

(51) Int. Cl.
*B60N 2/58*    (2006.01)
*B60N 2/80*    (2018.01)
*B60N 2/90*    (2018.01)

(52) U.S. Cl.
CPC ............. *B60N 2/914* (2018.02); *B60N 2/58* (2013.01); *B60N 2/5883* (2013.01); *B60N 2/80* (2018.02)

(58) Field of Classification Search
CPC ........ B60N 2/58; B60N 2/914; B60N 2/2222; B60N 2/5883
See application file for complete search history.

(56) References Cited

U.S. PATENT DOCUMENTS

| 2,685,327 | A | * | 8/1954 | Pitman | B60N 2/0284 |
| | | | | | 297/284.3 |
| 2018/0056836 | A1 | | 3/2018 | Schacht et al. | |
| 2018/0079336 | A1 | | 3/2018 | Hashimoto et al. | |
| 2018/0170230 | A1 | * | 6/2018 | Onuma | F04B 43/00 |

(Continued)

FOREIGN PATENT DOCUMENTS

| CN | 115230547 A | * | 10/2022 | |
| DE | 10341173 B3 | * | 1/2005 | ........... B60N 2/5825 |

(Continued)

OTHER PUBLICATIONS

Japanese Office Action received in corresponding Japanese application No. 2021-129737 dated Apr. 25, 2023 with English translation (12 pages).

*Primary Examiner* — Timothy J Brindley
(74) *Attorney, Agent, or Firm* — Rankin, Hill & Clark LLP (57) ABSTRACT

A seat back includes: a top-surface seat cover disposed on the top surface; a top-surface cushion pad arranged on a back side of the top-surface seat cover; a contact-surface seat cover disposed on the contact surface; a contact-surface cushion pad arranged on a back side of the contact-surface seat cover and under the top-surface cushion pad; and an airbag having adjustable internal air volume, wherein a lower end portion of the top-surface seat cover is fixed to a first anchorage within the seat back, while covering a lower surface of the top-surface cushion pad, and an upper end portion of the contact-surface seat cover is fixed to a second anchorage within the seat back, while covering an upper surface of the contact-surface cushion pad.

5 Claims, 7 Drawing Sheets

(56) References Cited

U.S. PATENT DOCUMENTS

| | | | |
|---|---|---|---|
| 2020/0245770 A1* | 8/2020 | Munechika | A47C 7/467 |
| 2020/0247296 A1* | 8/2020 | Wheeler | B60N 2/665 |
| 2022/0031876 A1* | 2/2022 | Ubale | A61L 2/24 |
| 2022/0305971 A1* | 9/2022 | Makiguchi | B60N 2/665 |

FOREIGN PATENT DOCUMENTS

| | | | | |
|---|---|---|---|---|
| DE | 102018108374 A1 * | 10/2018 | | |
| DE | 102017214313 A1 * | 2/2019 | | |
| JP | H05-55992 U | 7/1993 | | |
| JP | 2000038065 A * | 2/2000 | | B60N 2/2222 |
| JP | 2012-217754 A | 11/2012 | | |
| JP | 2013-091360 A | 5/2013 | | |
| JP | 2016-196202 A | 11/2016 | | |
| JP | 2017177853 A * | 10/2017 | | |
| JP | 2018103655 A * | 7/2018 | | |
| JP | 2020-093589 A | 6/2020 | | |
| JP | 2020-097343 A | 6/2020 | | |
| WO | WO-2009075365 A1 * | 6/2009 | | |
| WO | WO-2015049937 A1 * | 4/2015 | | |

* cited by examiner

SEAT STRUCTURE

CROSS-REFERENCE TO RELATED APPLICATION

This application claims the benefit of priority to Japanese Patent Application No. 2021-129737 filed on Aug. 6, 2021, the disclosures of all of which are hereby incorporated by reference in their entireties.

TECHNICAL FIELD

The present invention relates to a structure of a seat mounted in a vehicle.

BACKGROUND OF THE INVENTION

A conventional seat structure has been known to have an airbag, which is embedded in a seat, provided with air to inflate the airbag for changing a shape and/or an angle of a seat back.

Japanese patent application publication No. 2016-196202 (hereinbelow, referred to as Patent Document 1), for example, discloses a seat structure having an airbag arranged at a shoulder of a seat back. The seat structure disclosed in Patent Document 1 has the airbag inflated to deform a support surface, which is formed of the shoulder of the seat back, so as to be protruded forward.

SUMMARY

Problems to be Solved

Incidentally, the seat structure disclosed in Patent Document 1 has a seat cover (seat skin) formed continuously as a single member from a top end surface of the seat back, where a head rest is mounted, to a lower end of a contact surface of the seat back to contact with a back of an occupant.

The seat structure disclosed in Patent Document 1 therefore makes it difficult to deform the seat back, even when the airbag is inflated frontward in a vehicle front-rear direction with air supplied thereinto. As a result, the seat structure disclosed in Patent Document 1 has a small deformable area of the seat back and is thus unable to fully support a posture or a body shape of the occupant.

The present invention has been made in view of the above-identified problem and is intended to provide a seat structure having a larger deformable area of a seat back, as compared with a conventional one, to fully support a posture or a body shape of the occupant.

Solution to Problem

In order to achieve an objective as described above, the present invention provides a seat structure that includes: a head rest; and a seat back with a top surface, where the head rest is mounted, and a contact surface to contact a back of an occupant, the seat back including: a top-surface seat cover disposed on the top surface; a top-surface cushion pad arranged on a back side of the top-surface seat cover; a contact-surface seat cover disposed on the contact surface; a contact-surface cushion pad arranged on a back side of the contact-surface seat cover and under the top-surface cushion pad; and an airbag arranged on the back side of the contact-surface seat cover and having adjustable internal air volume, wherein a lower end portion of the top-surface seat cover is fixed to a first anchorage within the seat back, while covering a lower surface of the top-surface cushion pad, and an upper end portion of the contact-surface seat cover is fixed to a second anchorage within the seat back, while covering an upper surface of the contact-surface cushion pad.

The present invention provides a seat structure having a larger deformable area of the seat back, as compared with a conventional one, to fully support a posture or a body shape of an occupant.

DETAILED DESCRIPTION

Next, an embodiment of the present invention is described in detail, with reference to the drawings when required.

Figure 1:
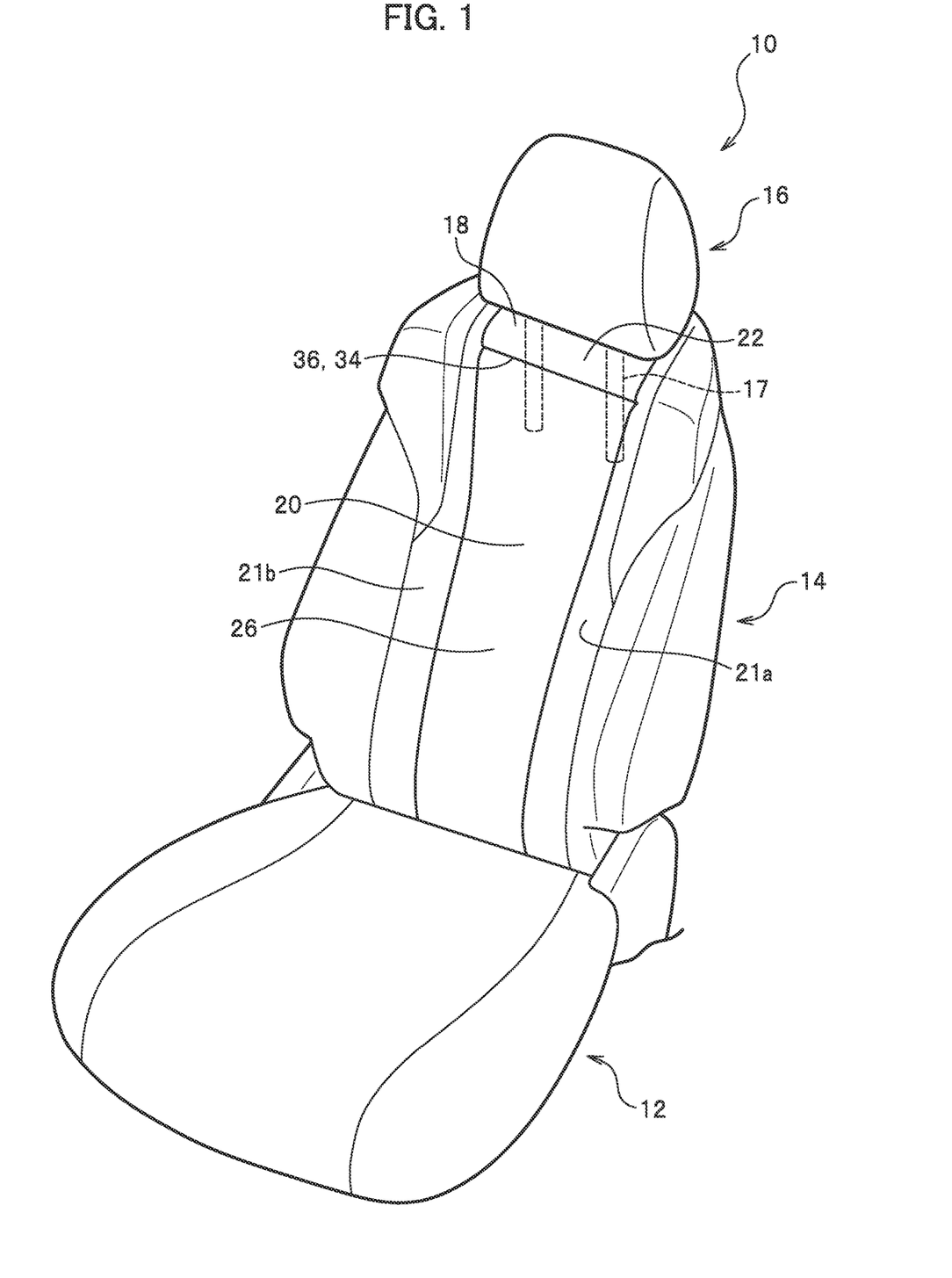
FIG. 1 is a perspective view of a seat applied with a seat structure according to an embodiment of the present invention.

A seat 10 having a seat structure according to the embodiment of the present invention includes a seat portion 12, a seat back 14, and a head rest 16, as shown in FIG. 1. The seat portion 12, seat back 14, and the head rest 16 have surfaces thereof covered with a seat cover to be described below.

Figure 2:
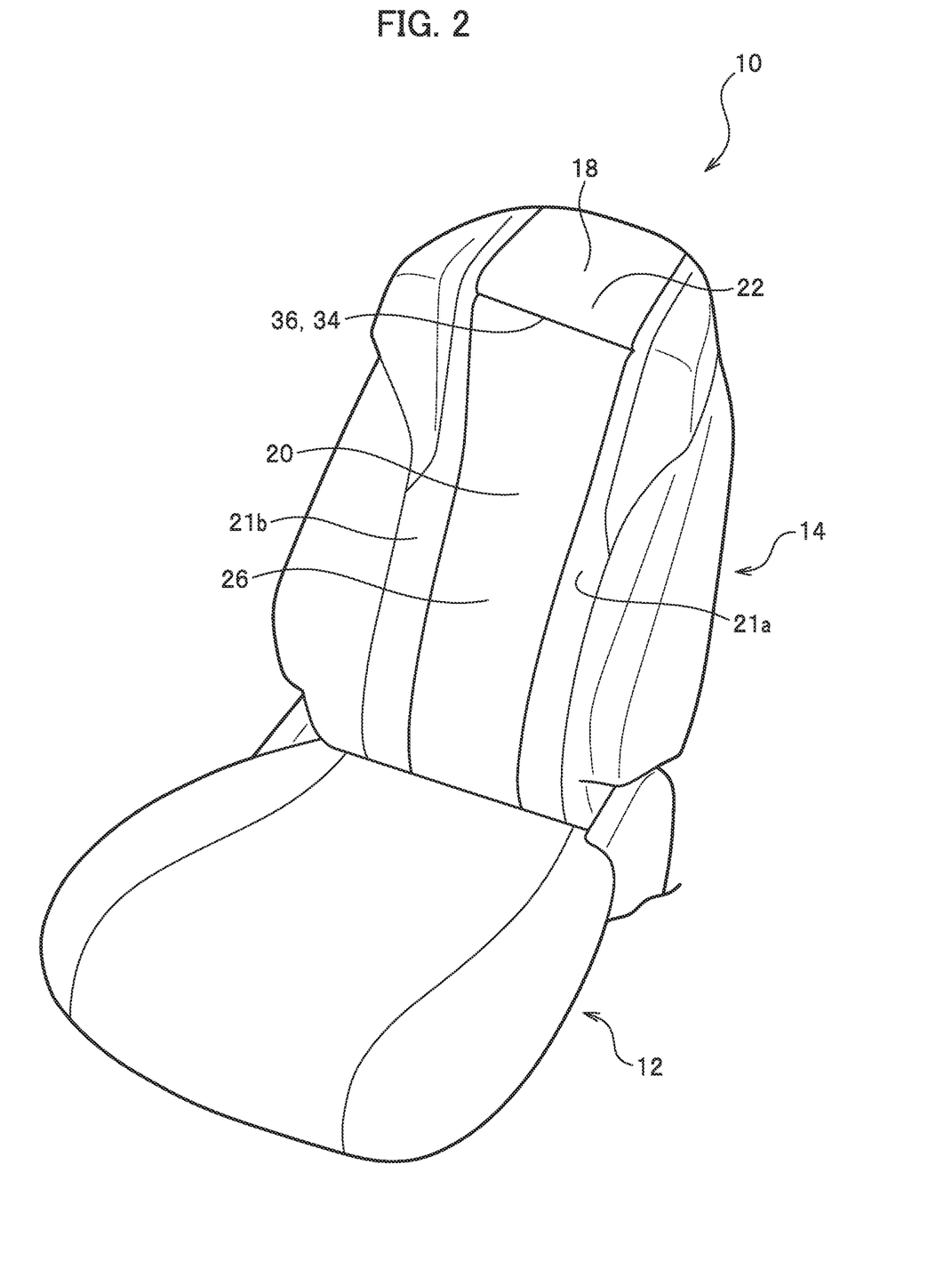
FIG. 2 is a perspective view of the seat in FIG. 1, with a head rest removed.
Figure 6:
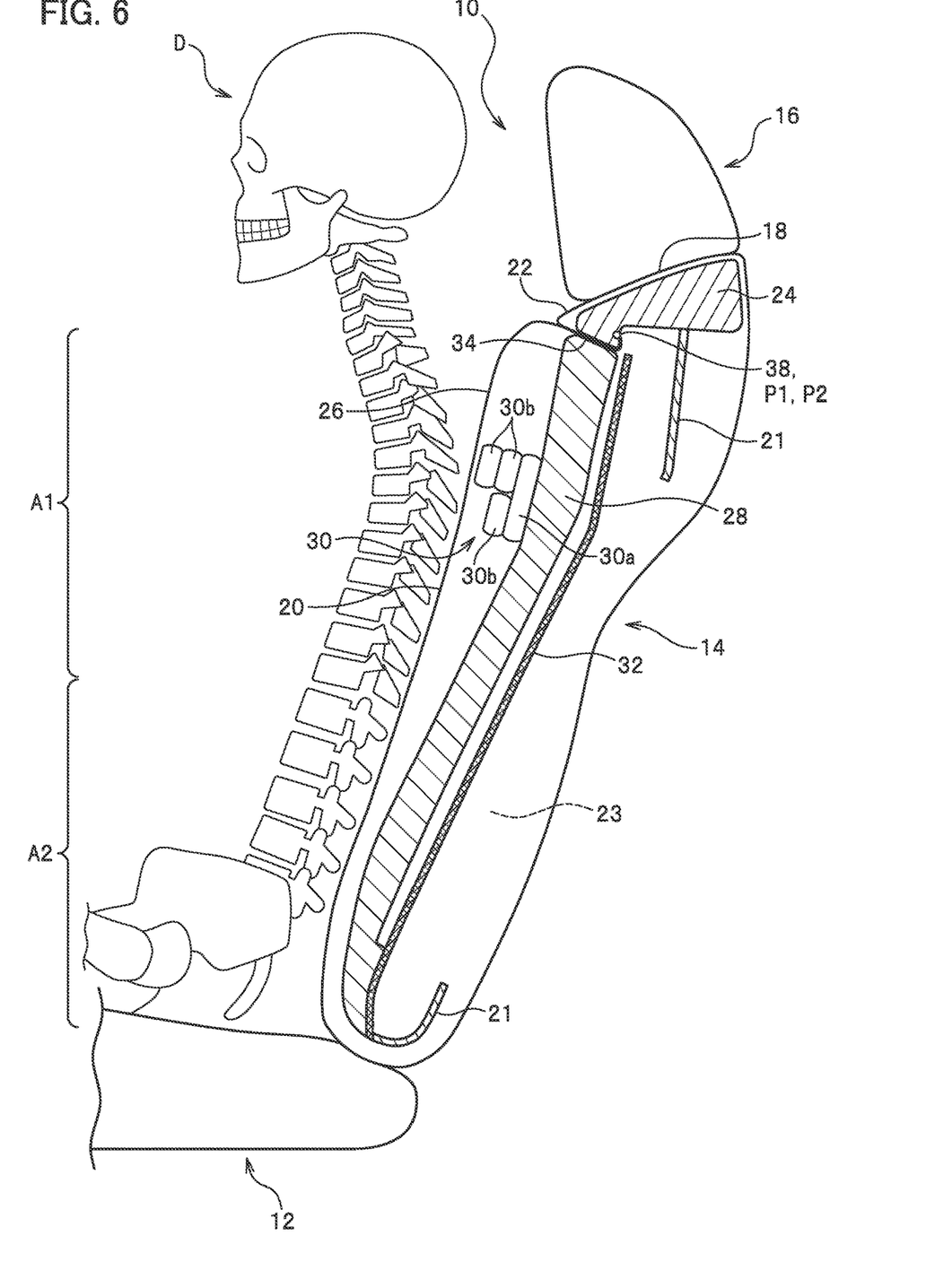
FIG. 6 is a diagram illustrating a scene with an airbag in FIG. 4 deployed to have a contact-surface seat cover expanded.

The seat portion 12 has a seat which an occupant D (se FIG. 6) sits on and receives a weight of the occupant D. The head rest 16 supports a head of the occupant D and is mounted on a top surface 18 (see FIG. 2) of the seat back 14 via two stays 17 (see FIG. 1). Note that FIG. 2 shows the seat 10 in FIG. 1, with the head rest 16 removed.

The seat back 14 works as a backrest to support an upper part (back) of the occupant D. The seat back 14 has the top surface 18, on which the head rest 16 is mounted, a contact surface 20 to contact a back of the occupant D, and a back surface (not shown) located on an opposite side and posterior in a vehicle front-rear direction of the seat back 14 to the contact surface 20. The top surface 18 is a substantially flat surface extending in a depth direction at a top of the seat back 14. The contact surface 20 is a surface on a front side of the seat back 14. The contact surface 20 is provided, on both left and right sides in a vehicle width direction thereof, with a left front surface 21a and a right font surface 21b, respectively.

Figure 3:
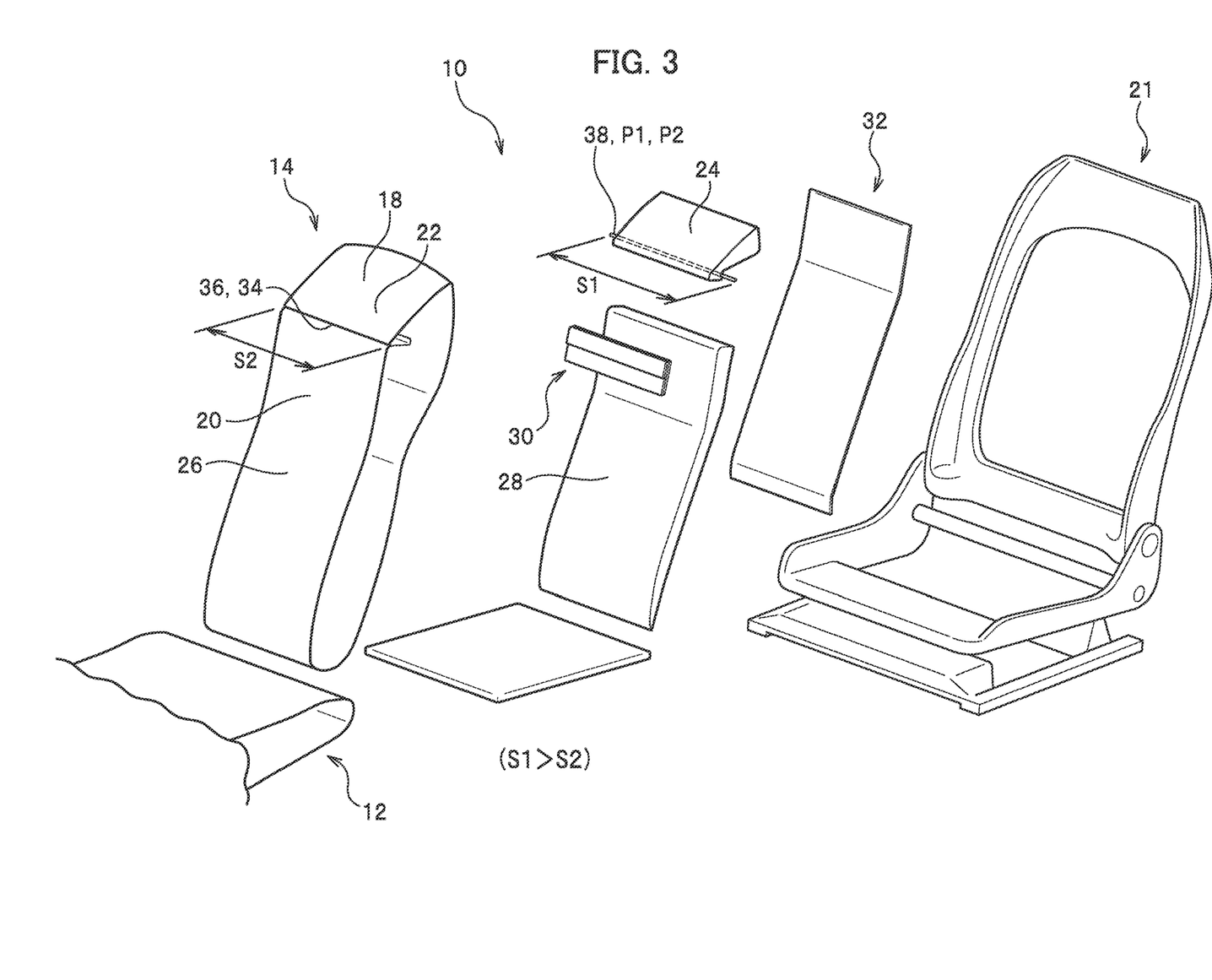
FIG. 3 is an exploded perspective view of the seat in FIG. 2.
Figure 4:
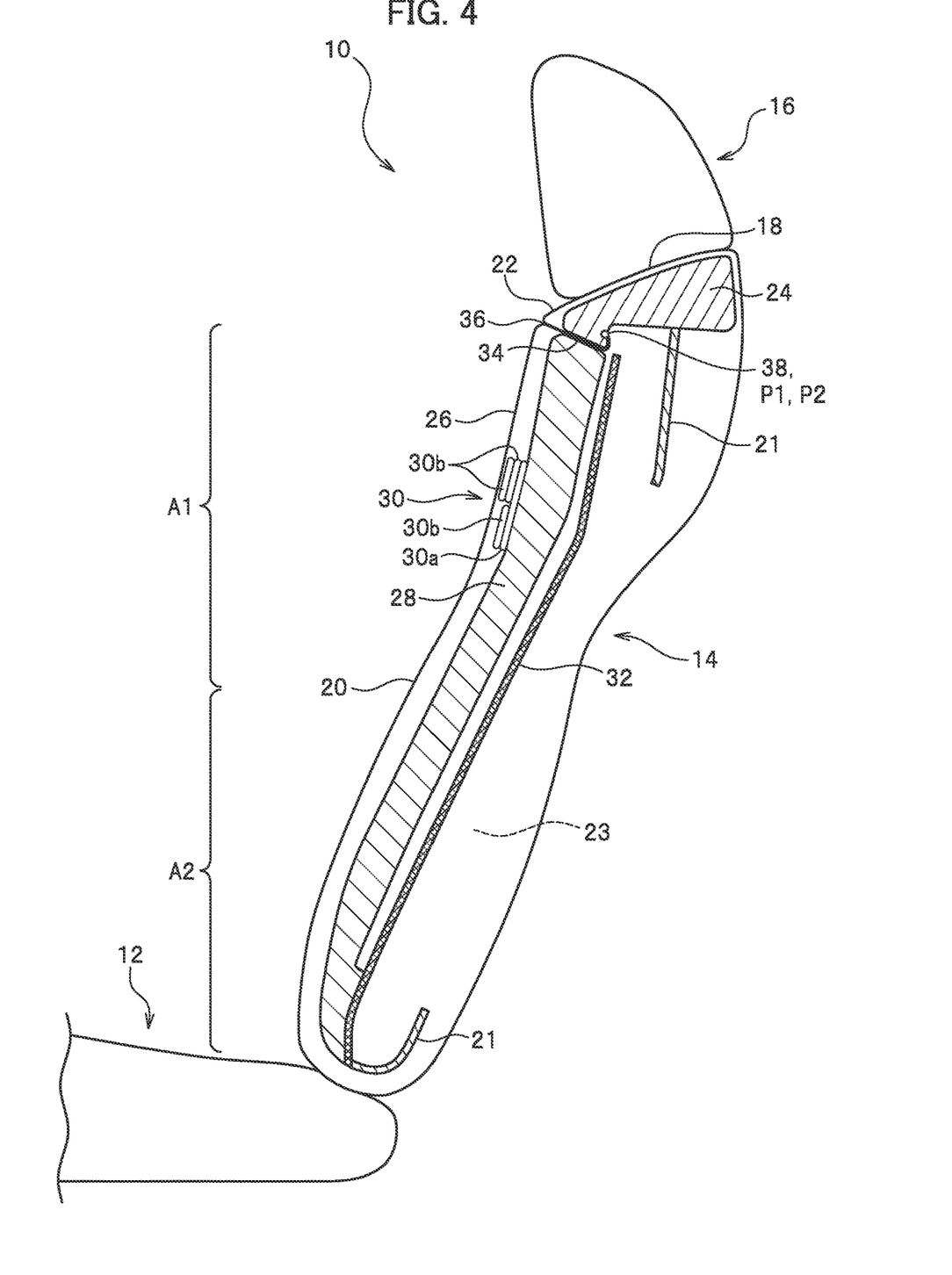
FIG. 4 is an end view of a seat back, along an up-down direction.

In addition, the seat back 14 has a seat frame 21 (see FIG. 3) making a framework of the seat 10, and a urethan sponge 23 (see FIG. 4). The seat frame 21 is a high rigidity frame to form a profile of the seat 10. The urethan sponge 23 is a cushion material stuffed between the seat frame 21 and the seat cover, for example.

Further, the seat back 14 has a top-surface seat cover 22 disposed over the top surface 18 where the head rest 16 is mounted, and a top-surface cushion pad 24 arranged on a back side of the top-surface seat cover 22. Still further, the seat back 14 has a contact-surface seat cover 26 disposed over the contact surface 20, and a contact-surface cushion pad 28 arranged on a back side of the contact-surface seat cover 26 and under the top-surface cushion pad 24.

Figure 5:
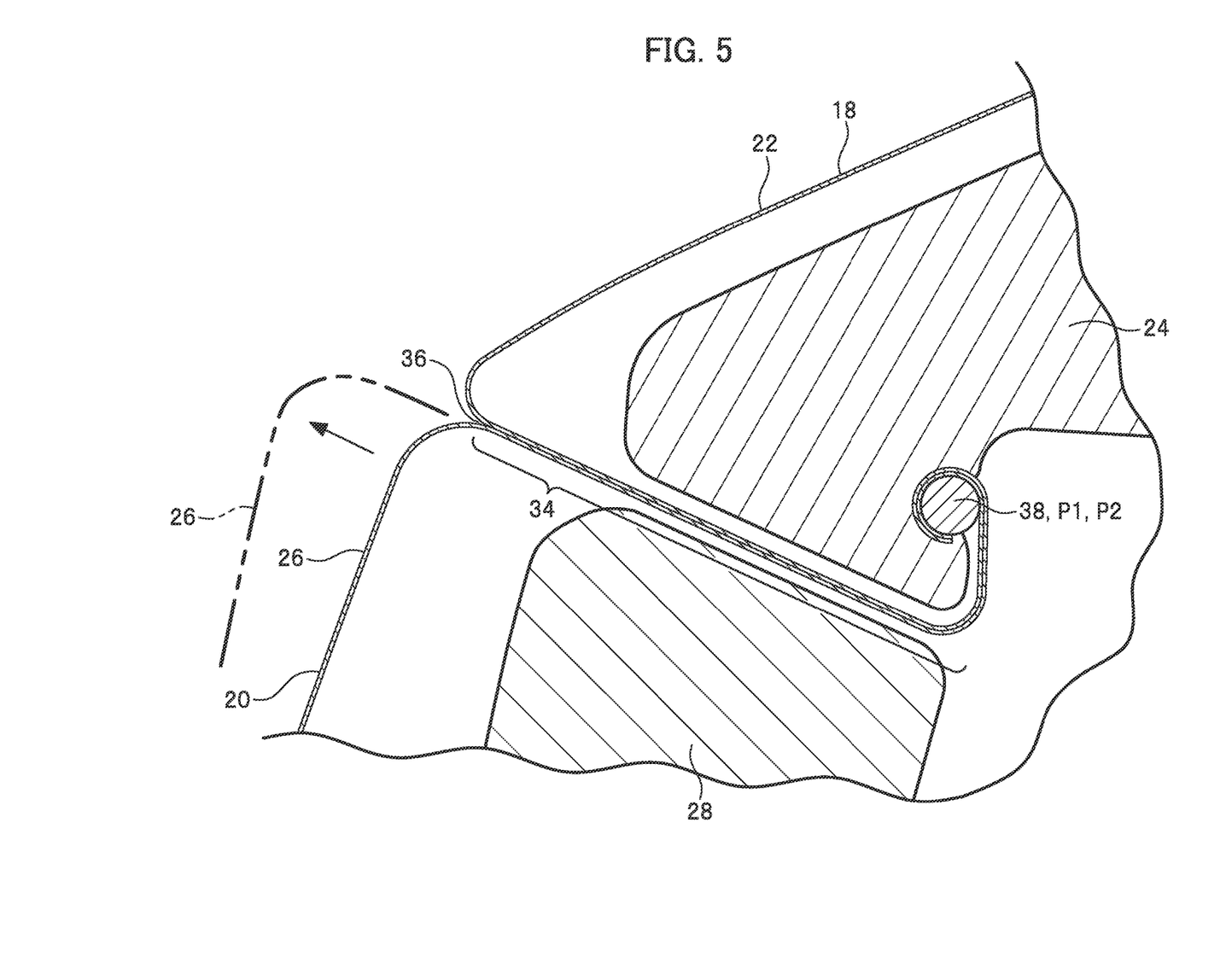
FIG. 5 is an enlarged cross-sectional view of an overlapped area in FIG. 4.

In the embodiment, the seat cover is separated into the top-surface seat cover 22 and the contact-surface seat cover 26 (see FIG. 5). Likewise, the top-surface cushion pad 24 and the contact-surface cushion pad 28 are separated from each other as individual members (see FIG. 4).

Still further, the seat back 14 has an airbag 30 arranged on a back side of the contact-surface seat cover 26 and having adjustable internal air volume, and a mat member 32 arranged on a back side of the contact-surface cushion pad 28. The airbag 30 is arranged between the contact-surface seat cover 26 and the contact-surface cushion pad 28.

As shown in FIG. 5, a lower end portion of the top-surface seat cover 22 is fixed to a first anchorage P1 within the seat back 14, while covering a lower surface of the top-surface cushion pad 24. Likewise, an upper end portion of the contact-surface seat cover 26 is fixed to a second anchorage P2 within the seat back 14, while covering an upper surface of the contact-surface cushion pad 24. Note that the first anchorage P1 and second anchorage P2 are described below in detail.

As shown in FIG. 5, the seat back 14 is formed to have an overlapped area 34 between the top-surface cushion pad 24 and the contact-surface cushion pad 28, having the lower end portion of the top-surface seat cover 22 and the upper end portion of the contact-surface seat cover 26 vertically overlapped with each other. That is, the lower end portion of the top-surface seat cover 22 is bent rearward and the upper end portion of the contact-surface seat cover 26 is bent rearward, at an upper portion of the seat back 14 between the top-surface cushion pad 24 and the contact-surface cushion pad 28, to have both of bent portions vertically overlapped with each other, thereby forming the overlapped area 34.

The "overlapped area 34" includes not only a simple case of the lower end portion of the top-surface seat cover 22 being vertically overlapped with the upper end portion of the contact-surface seat cover 26 but also following cases. For example, a case of the lower end portion of the top-surface seat cover 22 being vertically overlapped with the upper end portion of the contact-surface seat cover 26 and then being stitched together with thread or the like for connection, and a case of the lower end portion of the top-surface seat cover 22 and the upper end portion of the contact-surface seat cover 26 being adhered to each other with an adhesive or the like (connection area) are included.

Note that the overlapped area 34 is a slit (see FIGS. 1 and 2) extending substantially linearly along the vehicle width direction, when viewed from up ahead of a vehicle, and includes a crevice 36 (see FIG. 5) extending rearward from a front surface of the contact-surface seat cover 26.

As shown in FIG. 3, the first anchorage P1 and second anchorage P2 are composed of an insert wire 38 arranged within the seat back 14. The insert wire 38 has a dimension S1 in the vehicle width direction thereof larger than a dimension S2 in the vehicle width direction of the overlapped area 34 (S1>S2).

In addition, the insert wire 38 is embedded within the top-surface cushion pad 24, along the vehicle width direction. Further, the insert wire 38 is located higher than the overlapped area 34 having the lower end portion of the top-surface seat cover 22 and the upper end portion of the contact-surface seat cover 26 vertically overlapped with each other (see FIG. 5). Note that the first anchorage P1 and second anchorage P2 of the embodiment are composed of the single insert wire 38 (see FIG. 5), but the present invention is not limited thereto and the seat frame 21 (see FIG. 3) may be used for anchorages, for example. Alternatively, an additional member different from the insert wire 38 may be arranged so that the lower end portion of the top-surface seat cover 22 and the upper end portion of the contact-surface seat cover 26 are separately fixed.

The airbag 30 is composed of a pneumatic device which can be inflated and deflated using air pressure, and includes large and small airbags (see FIG. 3). The large and small airbags are stacked in layers along a thickness direction of the contact-surface cushion pad 28 (see FIG. 4).

In particular, a large bag 30a is disposed in a first layer which is closest to the contact-surface cushion pad 28, two small bags 30b are disposed vertically in a row in a second layer overlapping with the large bag 30a, and the single small bag 30b is disposed in a third layer only at a position overlapping with the upper small bag 30b in the second layer. Note that the airbag 30 includes the single large bag 30a and the three small bag 30b in the embodiment, but is not limited thereto and may include airbags in diverse sizes.

As shown in FIG. 4, the airbag 30 is arranged in the seat back 14 at a position higher than the center in a vehicle up-down direction. Additionally, at least a part of the contact-surface seat cover 26 in an upper half area A1 in the vehicle up-down direction of the seat back 14 has an elastic modulus (stretch rate) L1 larger than an elastic modulus (stretch rate) L2 of the contact-surface seat cover 26 in a lower half area A2 in the vehicle up-down direction of the seat back 14 (L1>L2). Note that "at least a part of the contact-surface seat cover 26 in the area A1" preferably includes an area of the contact-surface seat cover 26 overlapping with the airbag 30, for example.

The seat 10 having the seat structure of the embodiment is basically configured as described above, and advantageous effects of the seat structure is described next.

In the embodiment, the lower end portion of the top-surface seat cover 22 is fixed to the first anchorage P1 within the seat back 14, while covering the lower surface of the top-surface cushion pad 24. Likewise, the upper end portion of the contact-surface seat cover 26 is fixed to the second anchorage P2 within the seat back 14, while covering the upper surface of the contact-surface cushion pad 24.

In the embodiment, the top-surface seat cover 22 and the contact-surface seat cover 26 are separated from each other and are fixed to the first anchorage P1 and the second anchorage P2, respectively, within the seat back 14. When the airbag 30 arranged behind the contact-surface seat cover 26 is inflated with air supplied thereinto, tightness of the contact-surface seat cover 26 is eased and a part of the contact-surface seat cover 26 in the area A1, which overlaps with the airbag 30, is more likely expanded, as compared with a case using a conventional seat structure (see FIGS. 5 and 6). As a result, the embodiment gives a seat structure having a larger deformable area of the seat back 14, as compared with a conventional one, to fully support a posture or a body shape of the occupant D. Note that the top-surface seat cover 22 is separated from the contact-surface seat cover 26, to less likely affect the contact-surface seat cover 26 expanding toward a back of the occupant D.

In the embodiment, the seat back 14 is formed to have the overlapped area 34 (inclusive of the connection area) between the top-surface cushion pad 24 and the contact-surface cushion pad 28, having the lower end portion of the top-surface seat cover 22 and the upper end portion of the contact-surface seat cover 26 overlapped with each other (see FIG. 5). Additionally, the first anchorage P1 and second anchorage P2 are composed of the insert wire 38 arranged within the seat back 14. The insert wire 38 has the dimension S1 in the vehicle width direction thereof larger than the dimension S2 in the vehicle width direction of the overlapped area 34 (S1>S2) (see FIG. 3).

In the embodiment, the dimension S1 in the vehicle width direction of the insert wire 38 is set so as to be larger than the dimension S2 in the vehicle width direction of the overlapped area 34 (S1>S2), and the seat cover (the top-surface seat cover 22 and the contact-surface seat cover 26) is fixed to the insert wire 38. This suitably prevents the contact-surface seat cover 26 from coming off the insert wire 38 in the embodiment, even when the airbag 30 is deployed to give tension to the contact-surface seat cover 26. As a result, stability of the seat structure is improved.

In the embodiment, the insert wire 38 is embedded within the top-surface cushion pad 24, along the vehicle width direction (see FIG. 3). This causes the insert wire 38, having the lower end portion of the top-surface seat cover 22 and the upper end portion of the contact-surface seat cover 26 fixed thereto, to be easily embedded within the top-surface cushion pad 24. Additionally, the lower end portion of the top-surface seat cover 22 and the upper end portion of the contact-surface seat cover 26 are fixed to the single insert wire 38, and this allows for reducing the number of parts and the number of assembling steps.

In the embodiment, the airbag 30 is arranged in the seat back 14 at the position higher than the center in a vehicle up-down direction. Additionally, at least a part of the contact-surface seat cover 26 in the upper half area A1 in the vehicle up-down direction of the seat back 14 has the elastic modulus (stretch rate) L1 larger than the elastic modulus (stretch rate) L2 of the contact-surface seat cover 26 in the lower half area A2 in the vehicle up-down direction of the seat back 14 (L1>L2) (see FIG. 4).

In the embodiment, the contact-surface seat cover 26 has the elastic modulus L1 of a portion thereof in the area A1, overlapping with the airbag 30, set larger than the elastic modulus L2 thereof in the area A2 (L1>L2), to allow the portion of the contact-surface seat cover 26, in an area overlapping with the airbag 30, to be more likely expanded toward a back of the occupant.

Modifications

Next, a description is given hereinbelow of modifications of the vehicle seat structure according to the embodiment, with reference to FIGS. 7A to 7C. Note that the same components as those of the embodiment shown in FIGS. 1 to 6 are denoted by the same reference signs.

Figure 7A:
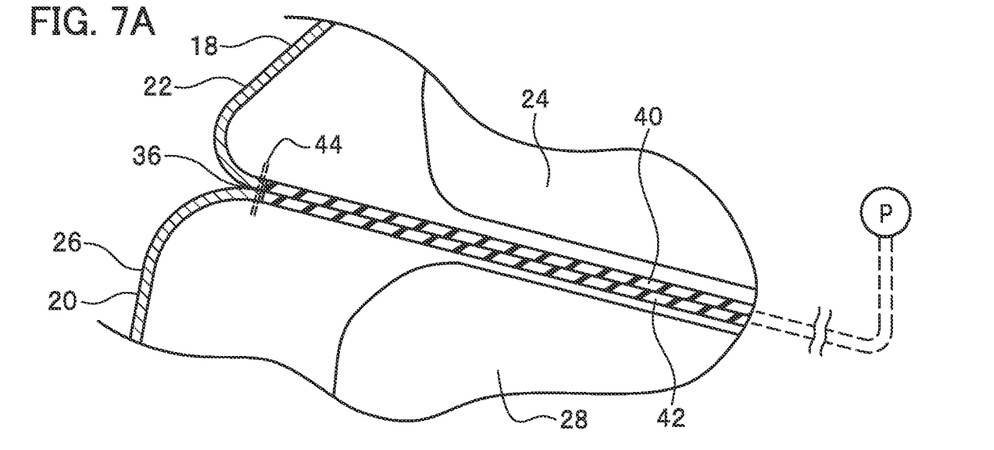
FIG. 7A is a partially enlarged cross-sectional view of a first modification of the embodiment in FIG. 1 to FIG. 6.

A first modification shown in FIG. 7A is different from the embodiment on the point that a portion of the top-surface seat cover 22, covering the lower surface of the top-surface cushion pad 24, is made of an elastic body 40 such as rubber, and a portion of the contact-surface seat cover 26, covering the upper surface of the contact-surface cushion pad 28, is made of an additional elastic body 42 such as rubber. Additionally, a connection 44, connecting a lower end of the top-surface seat cover 22 with an upper end of the contact-surface seat cover 26 with thread or the like, for example, is provided in vicinity to the crevice 36 as a beginning of the overlapped area 34. Note that the top-surface seat cover 22 and the contact-surface seat cover 26, except the elastic body 40 and the additional elastic body 42, are made of one or more fabric materials, for example.

Figure 7B:
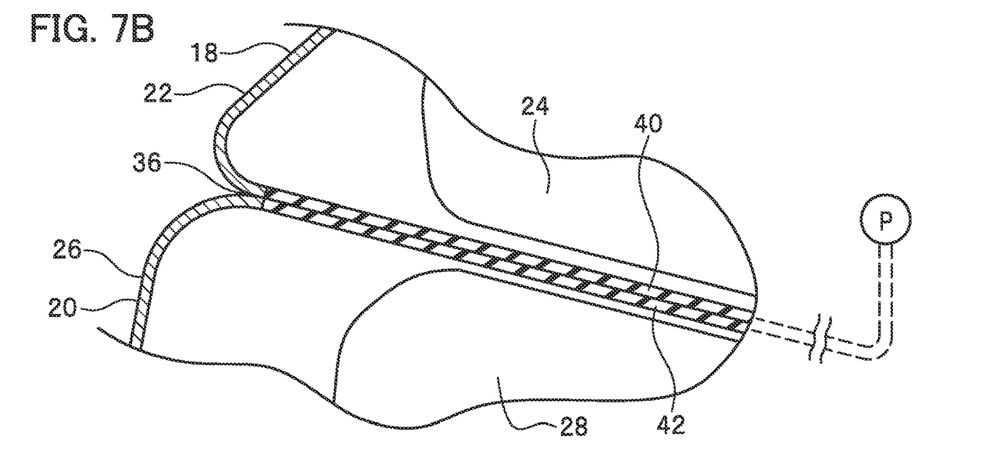
FIG. 7B is a partially enlarged cross-sectional view of a second modification of the embodiment in FIG. 1 to FIG. 6.

A second modification shown in FIG. 7B is different from the first modification on the point that there is no connection 44. All others are the same as those of the first modification.

Figure 7C:
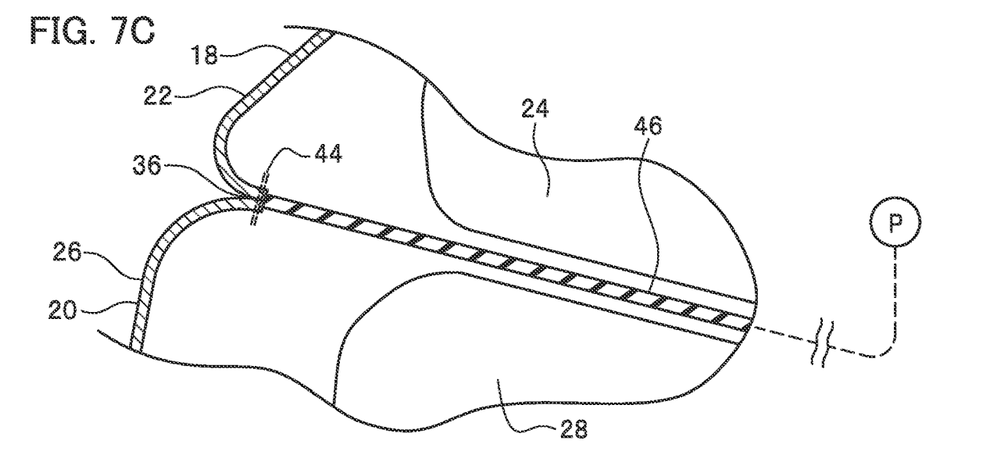
FIG. 7C is a partially enlarged cross-sectional view of a third modification of the embodiment in FIG. 1 to FIG. 6.

A third modification shown in FIG. 7C is different from the first and second modifications on the point that a single elastic body 46 (such as rubber) is provided between the top-surface cushion pad 24 and the contact-surface cushion pad 28, to connect the connection 44 and an anchorage P (the insert wire 38 or the seat frame 21).

The first to third modifications shown in FIGS. 7A to 7C are each characterized in that the contact-surface seat cover 26 expanded toward a back of the occupant D, after deployment of the airbag 30, is restored to an original condition (restoration) with use of an elastic force of the elastic body 40, 42, or 46 such as rubber.

LIST OF REFERENCE SIGNS

10: seat, 14: seat back, 16: head rest, 18: top surface, 20: contact surface, 22: top-surface seat cover, 24: top-surface cushion pad, 26: contact-surface seat cover, 28: contact surface cushion pad, 30: airbag, 34: overlapped area, 38: insert wire, 40; 46: elastic body, 42: additional elastic body, 44: connection, P1: first anchorage, P2: second anchorage, A1; A2: area, L1; L2: elastic modulus (stretch rate), S1; S2: dimension, and D: occupant.

What is claimed is:
1. A seat structure comprising:
a head rest; and
a seat back with a top surface, where the head rest is mounted, and a contact surface to contact a back of an occupant, the seat back including:
   a top-surface seat cover disposed on the top surface;
   a top-surface cushion pad arranged on a back side of the top-surface seat cover;
   a contact-surface seat cover disposed on the contact surface;
   a contact-surface cushion pad arranged on a back side of the contact-surface seat cover and under the top-surface cushion pad; and
   an airbag arranged on the back side of the contact-surface seat cover and having adjustable internal air volume,
wherein a lower end portion of the top-surface seat cover is fixed to a first anchorage within the seat back, while covering a lower surface of the top-surface cushion pad,
an upper end portion of the contact-surface seat cover is fixed to a second anchorage within the seat back, while covering an upper surface of the contact-surface cushion pad,
the seat back is formed to have an overlapped area between the top-surface cushion pad and the contact-surface cushion pad, having the lower end portion of the top-surface seat cover and the upper end portion of the contact-surface seat cover overlapped with each other,
a single insert wire arranged within the seat back acts as both the first and second anchorages, and the insert wire has a dimension in a vehicle width direction thereof larger than a dimension in the vehicle width direction of the overlapped area.

2. The seat structure according to claim 1, wherein the insert wire is embedded within the top-surface cushion pad, along the vehicle width direction.

3. The seat structure according to claim 1, wherein the airbag is arranged in the seat back at a position higher than the center in a vehicle up-down direction, and
at least a part of the contact-surface seat cover in an upper half area in a vehicle up-down direction of the seat back has a stretch rate larger than a stretch rate of the contact-surface seat cover in a lower half area in the vehicle up-down direction of the seat back.

4. The seat structure according to claim 1, wherein
a portion of the top-surface seat cover, covering the lower surface of the top-surface cushion pad, is made of an elastic body, and
a portion of the contact-surface seat cover, covering the upper surface of the contact-surface cushion pad, is made of an additional elastic body.

5. A seat structure comprising:
a head rest; and
a seat back with a top surface, where the head rest is mounted, and a contact surface to contact a back of an occupant, the seat back including:
 a top-surface seat cover disposed on the top surface;
 a top-surface cushion pad arranged on a back side of the top-surface seat cover;
 a contact-surface seat cover disposed on the contact surface;
 a contact-surface cushion pad arranged on a back side of the contact-surface seat cover and under the top-surface cushion pad; and
 an airbag arranged on the back side of the contact-surface seat cover and having adjustable internal air volume,
wherein the seat back has a connection, connecting a lower end of the top-surface seat cover with an upper end of the contact-surface seat cover,
an anchorage is provided within the seat back,
an elastic body is provided between the top-surface cushion pad and the contact-surface cushion pad, to connect the connection and the anchorage,
the seat back is formed to have an overlapped area between the top-surface cushion pad and the contact-surface cushion pad, having the lower end portion of the top-surface seat cover and the upper end portion of the contact-surface seat cover overlapped with each other,
an insert wire arranged within the seat back acts as the anchorage, and
the insert wire has a dimension in a vehicle width direction thereof larger than a dimension in the vehicle width direction of the overlapped area.

* * * * *